Jan. 21, 1969  D. G. STROH  3,423,585
SYSTEM FOR DETECTING SUSPENDED COLLOIDAL SOLIDS IN A GAS
UTILIZING AN IONIZATION CHAMBER AND
A STEP-DOWN AMPLIFIER
Filed Aug. 24, 1964

INVENTOR.
DONALD G. STROH
BY
Anderson, Spangler & Wynne
ATTORNEYS

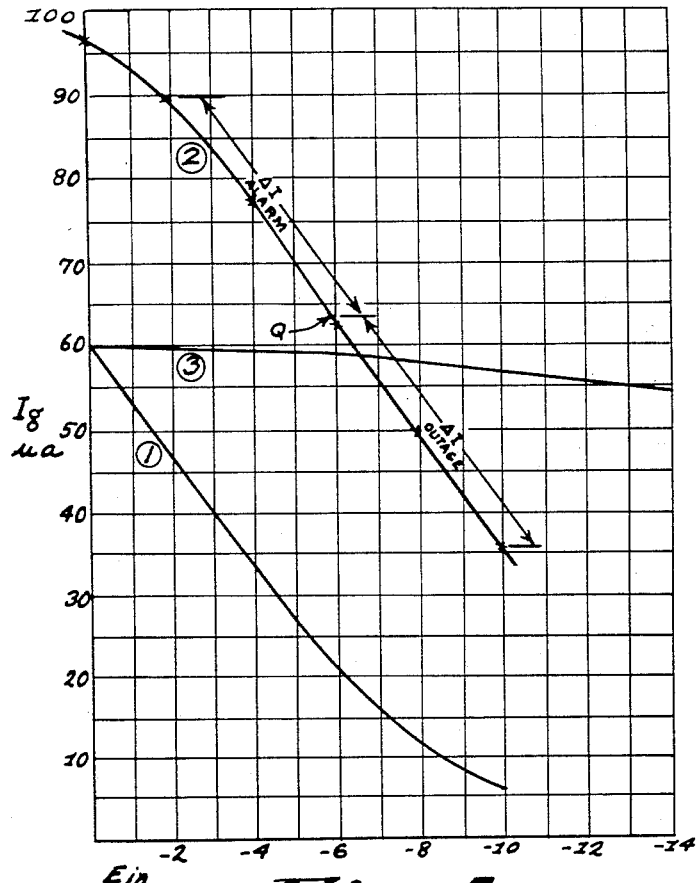
*Fig. 5*
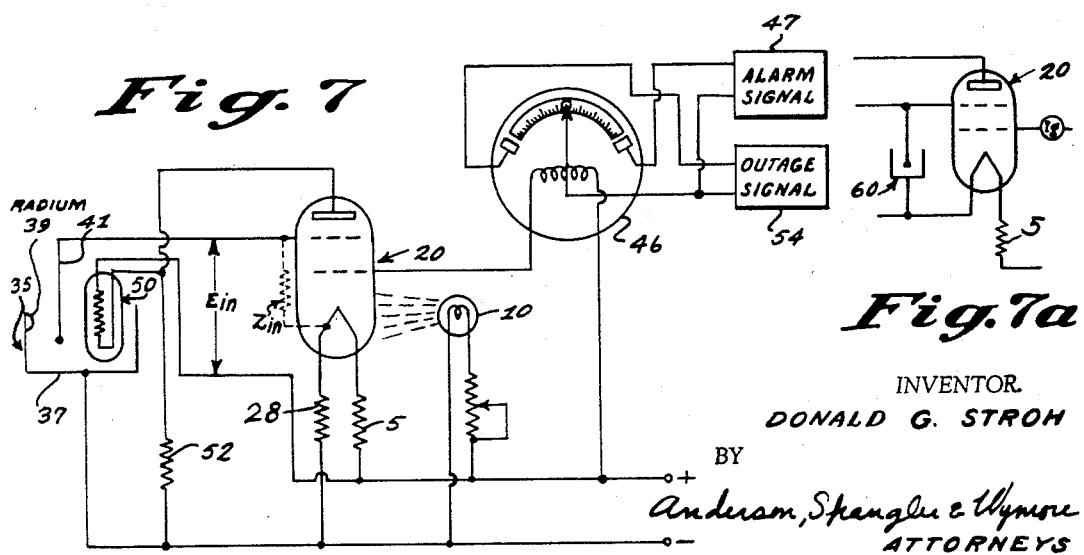
*Fig. 7*
*Fig. 7a*
INVENTOR.
DONALD G. STROH

United States Patent Office 3,423,585
Patented Jan. 21, 1969

3,423,585
SYSTEM FOR DETECTING SUSPENDED COLLOIDAL SOLIDS IN A GAS UTILIZING AN IONIZATION CHAMBER AND A STEP-DOWN AMPLIFIER
Donald G. Stroh, Denver, Colo., assignor, by mesne assignments, to Central Investment Corporation of Denver, a corporation of Colorado
Filed Aug. 24, 1964, Ser. No. 391,558
U.S. Cl. 250—43.5       7 Claims
Int. Cl. G01n 23/12, 21/26; H01j 37/00

ABSTRACT OF THE DISCLOSURE

An amplifier circuit utilizing a vacuum tube having the anode biased negative with respect to the cathode, the input being between the anode or screen grid and cathode and the output between the control grid and cathode rendered sensitive to voltages on the order of one to ten volts by the use of combined derated filament power while simultaneously increasing control grid bias from that normally required or used.

For purposes of the present disclosure a "step-down" amplifier shall be taken to mean one utilizing a vacuum tube to which an input is applied between the cathode and anode elements or between the cathode and screen grid, with the anode of the electron tube biased negatively with respect to the cathode and in which the control grid is positive with respect to the cathode and the corresponding grid current is measured as the amplifier output. Similar circuits have found limited use in the prior art as a means for measuring high potentials and have been variously referred to as "inverted amplifiers" or "inverted voltmeters." Using rated filament voltage in a typical triode or tetrode in such a circuit requires a negative anode potential of from one to five hundred volts before the tube is "cut off." With the necessity of using high voltages and the presence of the flat input voltage-output current curve, the circuit has had very little practical application. However, by the very fact that the tube is inverted in its operation, that is the input is applied between anode and cathode and the output is taken between the control grid and cathode, some very desirable features are inherent in the basic circuit and could be advantageously applied if the aforesaid limitations could be overcome. Notable among these is the extremely high input impedance and low output impedance which is valuable in many circuit applications where high resistance is to be measured or small changes of current are to be detected.

It is therefore the primary object of the present invention to provide means for altering the mode of operation of an inverted tube amplifier so as to make it sensitive to low voltages on the order of from one to ten volts while at the same time providing a characteristic output curve wherein substantial and easily measurable grid current changes are produced by very small changes in the input voltage.

A second object of the invention is to provide a step-down amplifier circuit which has an input impedance on the order of $10^{10}$ to $10^{13}$ ohms and an output impedance of less than $10^3$ ohms.

A still further object of the invention is to provide apparatus for measuring resistance and change of resistance, especially in very high orders of magnitude.

A further and associated objective is to provide apparatus of the type described which will measure high resistance accurately and may be used as a monitoring detector device operating without the use of voltages over fifty volts, all to the end that permanent installations will not be required by building and electrical codes to house wiring in metallic conduits.

Another and still further feature of the inventive circuitry is the greatly prolonged tube life which is possible because of the derated filament power at which the circuit operates which extends tube life from 20 to 100 times and permits use of the device in monitoring application with good reliability ratings.

One primary and very advantageous application of the invention is in the monitoring and supervision field for detecting suspended colloidal solids in a gas. The properties of the step-down amplifier of the present invention are ideally suited to match an ionization chamber to a low impedance transmission line, a low impedance transistor circuit or a meter movement which will furnish an output. Ion generating detection equipment has been extensively used in industrial applications such as fire and smoke detectors, furnace combustion control and in automatic control of chemical processes where aerosols are involved but the advantages brought to this area by the improvements disclosed herein will increase the efficiency and reliability and sharply reduce the cost of such detectors and make possible the use of inexpensive fire detection devices in domestic institutions.

In connection with monitoring applications of the invention it is a specific objective thereof to provide apparatus capable of registering an "alarm" condition and an "outage" signal, the latter indicating equipment failure.

Other objects and features will be in part apparent and in part pointed out in the further detailed disclosure which follows, in which emphasis will be given for explanatory purposes to only two of several possible input configurations and will be discussed in connection with the accompanying drawings in which:

FIGURE 5 is a graph showing the relationship between control grid current and tube input voltage with the preferred quiescent point of operation indicated by the letter Q.

FIGURE 7 is a schematic diagram of the amplifier circuit of the present invention with an ionization chamber connected to the input so as to form a products of combustion detector.

FIGURE 7a is a fragmentary schematic of the amplifier showing that the light source of FIGURE 7 may be replaced by a second ionization chamber connected between the screen grid and the filament.

Figure 1A:
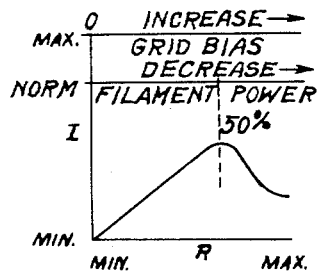
FIGURE 1a is a graphical representation of control grid current plotted against the filament resistance R on one horizontal axis and percentage of derating filament power while simultaneously increasing control grid bias on a second horizontal axis.

In its broadest and most fundamental sense the present invention resides in the discovery that unexpectedly good input-output characteristic curves are obtainable from the inverted operation of a multi-element vacuum tube which is supplied with a unique and novel combination of filament power and positive control grid bias. The input-output characteristic which is most desirable and is obtainable, is one in which there is significant and easily measurable change in output current for a small change in input voltage and where the input voltage is small in absolute values. It has been found that derating filament power simultaneously with increasing the positive bias on the control grid results in a peaking of control grid current at one particular point or combination. Operating the inverted tube in this fashion results in a steeply sloped and linear input-voltage output-current characteristic. A theoretical explanation of the phenomenon may assist in an understanding of the invention.

An inverted tube is characteristically a high input impedance device because when the anode is operated negatively with respect to the cathode a negative space charge is created within the tube structure which causes a deceleration of the electrons which are coming off of the cathode or other electron source due to the repulsion effect of like charges. Control of operating characteristics cannot be provided in such an environment by merely attempting to control the control grid bias. Such method is ineffective to change the input voltage sensitivity of the device because it results only in a decrease or increase in the number of electrons collected by the control grid without affecting the space charge within the tube and thus controls only the amount of output current. Keeping in mind that the high input voltages required to operate inverted tubes are necessary in order to create sufficient space charge to decelerate the highly accelerated electrons boiling off the filament, it is apparent that if the electrons had less acceleration and velocity less space charge would be necessary to substantially influence the current flow within the tube. As stated earlier, the concept of the present invention is embodied in the act of derating the power to the filament or cathode, thus causing the electrons to move away from the said electron source with less velocity and acceleration than with a normally operating filament. It has been found that small reductions in filament power are equivalent to large increases in anode potential to get the same current change. The role of the grid bias is really nothing more than an endeavor to collect all of the electrons which are being emitted from the electron source, that is the filament or cathode. Increasing the control grid bias beyond a point of optimum collection creates an adverse shielding effect between the negative space charge of the anode and the filament because the control grid is at a positive polarity and consequently develops a positive space charge as soon as electron collection reaches a saturated condition.

Figure 1:
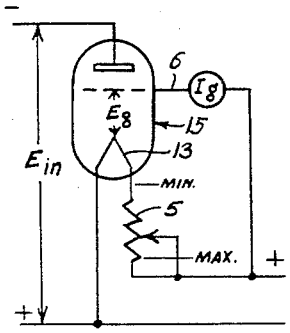
FIGURE 1 is a schematic diagram of a basic step-down amplifier according to the present invention having a resistor means for derating the filament power while simultaneously increasing the control grid bias until a point of coincidence is obtained to provide maximal operating efficiency with regard to input voltage versus output control grid current.
Figure 1B:
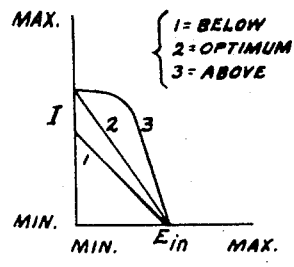
FIGURE 1b is a graphical plot of grid current versus input voltage with the three different curves representing three different values of filament power and control grid bias.

Referring now to the drawings and first to the illustrations of FIGURES 1, 1a and 1b, a typical triode vacuum tube 15 is shown connected as an inverted or step-down amplifier. One of the fundamental and important features of the discovery discussed above is found in the utter simplicity of the single variable resistor 5, connected between the filament 13 and the grid 6, which permits the derating of filament power to proceed simultaneously with the increasing of control grid bias so that the optimum combination of filament power and grid potential can be selected. The graph of FIGURE 1a illustrates clearly that as the resistance 5 is increased the filament power is being reduced while the grid potential is going more and more positive with respect to the filament until at a point representing fifty percent of rated filament power the grid current is at a maximum value. Further derating of filament power and increasing grid potential results in lower output current. The full impact of the importance and significance of this mode of operation is not apparent however, until the curves of FIGURE 1b and FIGURE 5 are examined in the light of prior art circuits of a similar type. The three curves of FIGURE 1b are merely illustrative input-output curves showing various values of the resistor 5 as being below, above or at optimum operation. The curve indicated as number 2 is representative of operation at 50% of rated filament power, as shown in FIGURE 1a. By reference to FIGURE 5, an enlarged fragmentary view of the curves of FIGURE 1b, it is seen that an input voltage as small as four volts is now sufficient to produce an output current of seventy-seven microamperes and a change of four volts brings about a change of approximately twenty-seven microamperes over a linear range of about nine or ten volts. These values of course are exemplary only and are not cited as limitations to the circuit.

In considering the invention in the light of input and output figures, such as those referred to above, sight should not be lost of the fact that the primary purpose of using the step-down amplifier is to obtain the advantage of the extremely high input impedance which inverted tube operation provides. Similar output curves are of course obtainable in the prior art from normal operation and connection of electron tubes but these arrangements do not approach the capability of the step-down amplifier as a high-to-low impedance matching device. Even cathode follower circuits are far inferior in these respects. In addition to achieving novel and very advantageous operating characteristics, the derating of filament power provides a windfall advantage in that tube life is extended from fifty to one hundred times normal life expectancy. Such a feature does more than increase the economy of operation—it opens up the field of monitoring and supervision as uses where heretofore the span of normal tube life has seriously curtailed the use of tube circuitry where high reliability was a consideration.

It will be understood that the circuit of FIGURE 1 is merely illustrative of the means employed (resistor 5) to arrive at the peak operating point shown in FIGURE 1a, and once the resistance value which will furnish this operation is determined for any specific tube type the resistor may be a fixed value in the circuit as it is shown in the remaining figures.

Figure 2A:
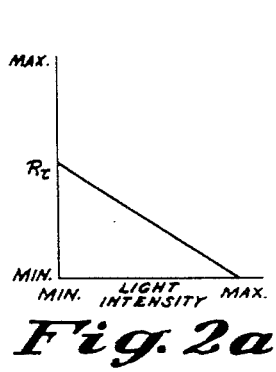
FIGURE 2a is a graph showing the relationship between the internal resistance of the electron tube in FIGURE 2 and intensity of light being directed against the tube elements.
Figure 2:
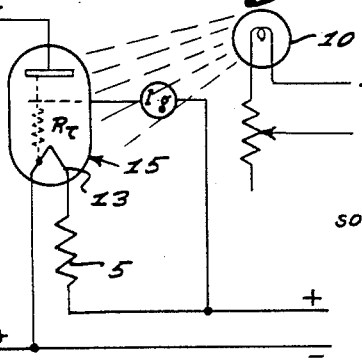
FIGURE 2 is a schematic diagram of step-down amplifier of the present invention showing a light source which is positioned next to the envelope of the tube.

Referring now to FIGURE 2 and to the graph of FIGURE 2a, an additional concept is illustrated; that is, of the change in internal resistance between filament and anode as a function of light intensity where an incandescent light 10 acts as a source of light energy which is directed against the elements of the tube 15. The photo-electron or photo-emissive phenomenon is responsible for the liberation of additional electrons in the tube which results in an effective lowering of the internal resistance of the tube. By varying the light intensity over easily accessible ranges the interal resistance $R_t$ can be changed over a very great range of values, all of which will become meaningful as the disclosure continues.

Figures 3, 3A:
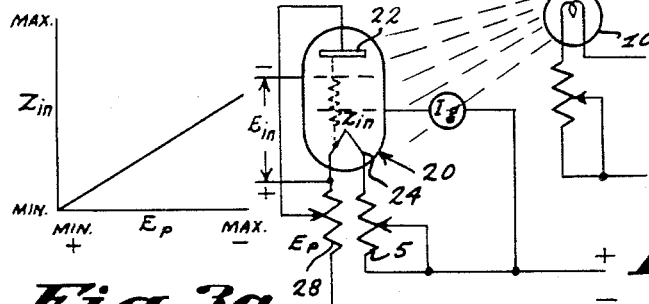
FIGURE 3 is a schematic diagram of a step-down amplifier similar to the one shown in FIGURE 2, but having a tetrode type tube having a modified anode circuit.
FIGURE 3a is a graph showing the relationship of the anode voltage of the electron tube of FIGURE 3 and the input impedance.

FIGURE 3 shows the final stage of development in the step-down amplifier of the instant invention. A typical tetrode electron tube 20 replaces the triode 15 of the circuit of FIGURE 2 in order that the effective input impedance $Z_{in}$ may be made even greater by connecting the anode 22 to a point of potential lower than that of the filament 24. A means for adjusting the magnitude of the anode potential $E_p$ is found in the potentiometer 28, the wiper of which is connected directly to the anode of the tube. As the voltage on the anode is made more negative with respect to the filament, the input impedance increases proportionately, as seen in the graph of FIGURE 3a.

Figure 4:
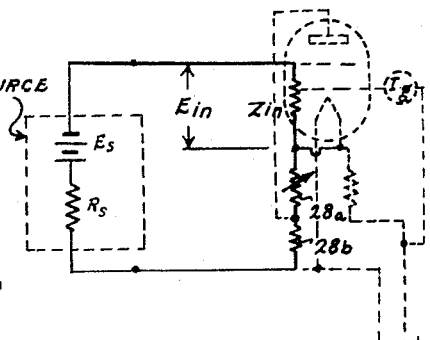
FIGURE 4 is an equivalent circuit diagram of the input circuit to the amplifier shown in FIGURE 3.

The respective effects of the photo-emissive phenomenon produced by the light source 10 and that produced by the change of anode potential becomes readily apparent by reference to the quasi-equivalent circuit of FIGURE 4 where $Z_{in}$ is very much larger than the anode voltage resistors 28a and 28b.

Since the tube input voltage $E_{in}$ is, in effect, the drop across $Z_{in}$, the voltage $E_{in}$ is a direct function of the value of $Z_{in}$ and any change, such as that produced by the aforementioned photo-emissive effect, will change the input voltage accordingly. Changes in the relatively small resistance 28a, while having a measurable effect on $E_{in}$, will not be substantially influential. While it may be the objective of most circuit designs to a match, as exactly as possible, the source and input impedance in order to achieve maximum energy tranfer, it is the objective of the instant design to adjust the tube input impedance with respect to the source impedance so as to achieve an input voltage $E_{in}$ which will be located centrally (at point Q) of the linear steep portion of the E–I curve, as illustrated in the curve of FIGURE 5, all to the end that changes in $E_{in}$ will be reflected by as large as possible changes in grid current $I_g$ regardless of whether the change in $E_{in}$ is up or down. By reference again to FIGURE 4, it will be seen that any change in $E_s$ or $R_s$ will effect a change in $E_{in}$ that will be linearly reflected by a change of grid current $I_g$.

Figure 6:
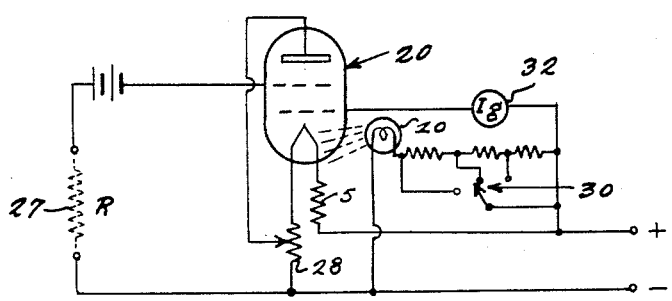
FIGURE 6 is a schematic diagram of the invention when used as a megohm meter with the unknown resistance shown in the dotted lines indicated as R.

To apply the circuit as a megohm meter, $R_s$ is replaced by the unknown high resistance 27 and the light controlling variable stepping resistance 30 acts as a range selector switch (see FIGURE 6). The grid current meter 32 is calibrated for the various ranges of resistance in a manner well known in the art.

A second and highly practical application of the step-down amplifier circuit and the one to which disclosure is primarily addressed contemplates replacing the source voltage and resistance $E_s$ and $R_s$ with an open ionization chamber having an integral radiation source. Such a combination produces unexpectedly good results when used as a products of combustion detector. Ionization chamber devices, as such, are old in the art of combustion detectors, but suffer from several serious disadvantages which the present circuit overcomes. Other arrangements utilize an open ionization chamber but still are hindered by lack of low voltage sensitivity. In addition, prior art detectors also require a very high resistance control grid bias resistor with its associated temperature nistability and other limitations inherent in a fixed reference source.

FIGURE 7 shows a preferred embodiment of a detector unit utilizing an ionization chamber 34 which is open to the air to be sampled. The elements of the chamber include a cathode 37 which carries a small amount of radioactive material 39 such as radium and an anode or ion collector 41. The operation of the ionization chamber is well known in the art and therefore limited attention will be devoted to explaining the functioning of the chamber in this specification except as these functions are of importance in the present invention.

The alpha particles emitted by the radium 39 are helium atoms which, when projected from the surface of the radium possess the property of rendering the air through which they pass conductive by ionizing part of the air molecules. As voltage is applied to the electrodes in the chamber a small current will flow through the high resistance chamber due to the fact that the ions and electrons resulting from the ionizing action of the alpha radiation are driven towards the electrodes by the electric field. Since the alpha radiation has a short range, it can be stopped relatively easily by such materials as air, paper, metal or colloidal particles such as are found in smoke and dust. Whether visible or not the colloidal particles which are present in the products of combustion act to prematurely stop the alpha radiation, resulting in the formation of fewer electrons and ions and effectively increasing the resistance of the chamber and reducing the electric current therethrough. As will be obvious, the reduction of ionization chamber current reduces the input voltage $E_{in}$ to the step-down amplifier resulting in an upward swing in the grid current. The change in current is sufficient without further amplification to operate a switch contact meter movement 46 which can be made to operate an "alarm signal" 47 in a manner well known.

One serious disadvantage of smoke detectors of the prior art and one which could easily become prominent in an instrument of the high sensitivity of the one just described is the problem of moving air currents. When subject to moving air, the ionization chamber tends to become erratic in its operation because the moving air in the chamber tends to remove the free ions and electrons from the chamber and thus create the same effect as the presence of smoke. This characteristic introduces complications when attempting to locate a detector in an area where air velocities are unstable because the detector cannot be as sensitive as those placed in areas where air velocity is constant. It is therefore another purpose and objective of the invention to provide a products of combustion detector that retains high sensitivity but responds only to decreases in ionization caused by foreign matter and not by flow velocities of the gas being monitored.

To componsate for the air velocity effect, a "thermistor" 50, or similar thermally sensitive device having a negative temperature coefficient is placed in or near the chamber 35 in order that the resistance of the device is a function of the air velocity through the chamber. As seen in FIGURE 7 the thermal resistor 50, together with a voltage divider resistor 52 in series therewith have replaced the anode voltage resistors 28a and 28b of the equivalent circuit. As the resistance of the resistor 50 changes with moving air currents, the voltage at the junction of the resistors 50 and 52 changes, resulting in a varying of the anode potential. By proper selection of components the changing anode potential can be made to shift the quiescent operating point an amount just sufficient to cancel the effects of air currents.

Finally, it will be noted that if the circuit fails, grid current will be reduced to zero and the switch contacts of the meter movement 46 will close at the other end of the scale and activate the outage signal 54.

In view of the fact that the light source 10 and the fine adjustment resistors 50 and 52 enable the quiescent point of operation to be precisely selected, these features are useful for many applications of the circuit, such as those explained above, however, if adjustability is not required or if it becomes necessary or convenient to hold the input impedance $Z_{in}$ at a constant level, then a second ionization chamber 60 may be connected from screen grid to filament to maintain the input impedance at a fixed high level (see FIGURE 7a).

Before concluding the description of the invention, it may be noted that although a directly heated cathode type tube has been used for illustrative purposes in this specification, other types may be well suited to employment in the circuit. Tubes having indirectly heated cathodes, although somewhat less desirable, may be used if proper acount is taken of the voltages at which the anode and cathode are operated.

Having thus described the several useful and novel features of the step-down amplifier and a few of its possible input circuit configurations in connection with the accompanying drawings, it will be seen that the many worthwhile objectives for which it was designed have been achieved. Although but a few of the possible embodiments of the invention have been illustrated and described herein, I realize that certain additional modi- fications may well occur to those skilled in the art within the broad teaching hereof; hence it is my intention that the scope of protection afforded hereby shall be limited only insofar as said limitations are expressly set forth in the appended claims.

I claim:

1. Apparatus responsive to the colloidal solid content of a gaseous fluid comprising;
   an ionization chamber having therein an anode, a cathode and radioactive material;
   a tetrode vacuum electron tube including a filament, a control grid, a screen grid and an anode;
   means forming a light source and positioned with respect to the said tube so that light from the source falls on the tube;
   a voltage source having positive and negative output terminals;
   resistance means serially connected between one side of the filament and the control grid with the juncture between the control grid and the resistance means being connected to the positive terminal of the voltage source and the other side of the filament being connected to the negative terminal of the voltage source;
   resistance means forming a connection from the anode of the said tube to the negative terminal of said voltage source;
   an electrical connection from the anode of the ionization chamber to the screen grid of the electron tube;
   an electrical connection from the cathode of the ionization chamber to the negative terminal of the voltage source; and
   means responsive to current flow interconnecting the positive terminal of the voltage source and the control grid of the electron tube wherein the value of the resistance means serially connected between one side of the filament and the control grid is selected to provide substantially maximum grid current flow.

2. The apparatus of claim 1 wherein a further resistance means forms a connection between the tube anode and the positive terminal of the voltage source which comprises a thermally sensitive device which is physically positioned in close proximity to the said ionization chamber.

3. Apparatus responsive to the colloidal solid content of a gaseous fluid comprising;
   an ionization chamber having a housing open to the air and in which there is positioned an anode member, a cathode, and quantity of radioactive material;
   an electron tube comprising a source of electrons, an anode member and a plurality of grids positioned intermediate the source of electrons and the said tube anode;
   a source of potential and means connecting it to said electron source;
   a source of biasing potential having a more negative potential than the said source of electrons;
   means connecting said tube anode to the biasing potential;
   an electrical connection between the anode of the ionization chamber and the grid nearest to the tube anode;
   means connecting the cathode of the ionization chamber to the said source of biasing potential; and
   voltage dropping means connected between the electron source and the grid closest thereto wherein the resistance of the voltage dropping means is chosen to provide substantially maximum current flow between said grid and the electron source and further includes radiation producing means operative on the conductivity of the electron tube to influence the internal resistance thereof.

4. The apparatus of claim 3 wherein the radiation means includes an ionization chamber having an anode, a cathode and a source of radioactive radiations and wherein the anode thereof is connected to the said grid nearest the tube anode and the cathode thereof is connected to the said filament circuit of the tube.

5. The apparatus of claim 3 wherein the radiation means includes a light source whose radiated light energy falls upon the tube elements to produce a photo-emissive effect and means for controlling the intensity of the light energy radiated therefrom.

6. In apparatus responsive to collodial solid content of a gaseous fluid;
   electrical conduction means having a pair of terminals;
   an electron tube comprising a source of electrons, an anode member and a plurality of grids positioned intermediate the source of electrons and the said tube anode;
   a voltage source and means including a resistance means serially connecting it to the electron source;
   a source of biasing potential having a more negative potential than the said source of electrons;
   means connecting said tube anode to the biasing potential;
   an electrical connection between one terminal of the electrical conduction means and the grid nearest to the tube anode;
   means connecting the other terminal of the electrical conduction means to the said source of biasing potential; and
   means responsive to current flow electrically connected between the positive voltage end of the said resistance and the grid closet to the electron source wherein the resistance of the resistance means is chosen to provide substantially maximum current flow between the electron source and the grid closest to the electron source.

7. A step-down amplifier circuit comprising;
   a vacuum electron tube having a source of electrons, an anode and a plurality of grids intermediate the anode and electron source;
   resistance means forming an output load circuit;
   means connecting said load circuit between the electron source and the grid positioned closest thereto;
   an input circuit including means forming a high resistance electrical current path;
   means connecting said input circuit between the electron source and a second one of said grids;
   a source of biasing potential more negative than the electron source; and
   means connecting the said source to the anode of the tube wherein the resistance of said resistance means is selected to provide substantially maximum current flow between the electron source and the grid nearest thereto.

References Cited

UNITED STATES PATENTS

| 1,788,553 | 1/1931 | Thomas | 250—214 X |
| 2,641,626 | 6/1953 | Gurevics | 330—145 X |
| 3,028,490 | 4/1962 | Guilleux | 250—43.5 R |

FOREIGN PATENTS

| 1,241,411 | 8/1960 | France. |

ARCHIE R. BORCHELT, *Primary Examiner.*

U.S. Cl. X.R.

250—83.6; 324—124; 330—145